Oct. 19, 1965   I. L. GLERUM   3,213,395
FORCE SENSING APPARATUS
Filed April 21, 1959
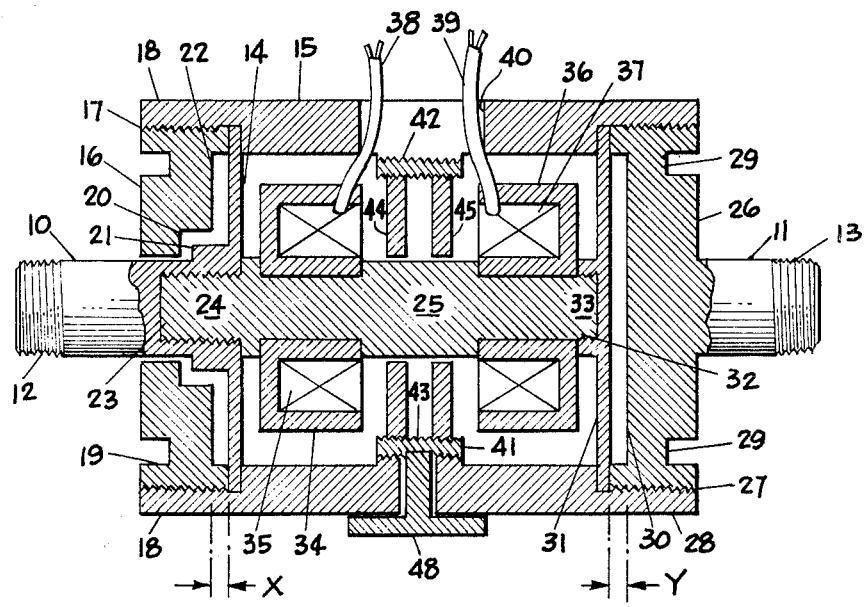
FIG. 1.
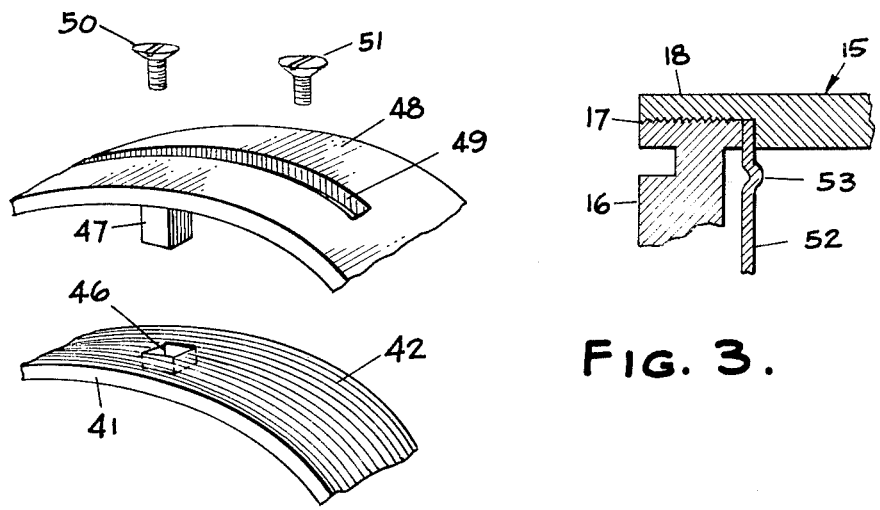
FIG. 2.
FIG. 3.
INVENTOR.
IRVIN L. GLERUM
BY Elliott & Pastoriza
ATTORNEYS.

United States Patent Office 3,213,395
Patented Oct. 19, 1965

3,213,395
FORCE SENSING APPARATUS
Irvin L. Glerum, Canoga Park, Calif., assignor to W. C. Dillon & Company, Inc., a corporation of California
Filed Apr. 21, 1959, Ser. No. 807,783
2 Claims. (Cl. 336—30)

This invention generally relates to a force measuring or force sensing device and more particularly concerns an apparatus for measuring either compressive or tensile loads imposed either directly or indirectly on the apparatus. The forces involved are measured as a function of the relative movement between two or more members in response to the aforementioned loads or forces imposed upon the apparatus.

Various force measuring and force sensing devices, or dynamometers as they are sometimes referred to in the art, are presently available in a variety of conventional constructions, for example, as set forth in Patent Numbers 2,285,500 and 2,287,299.

The present invention for force sensing apparatus is a continuation-in-part of applicant's co-pending applications entitled, "Dynamometer," filed October 6, 1958 and assigned Serial No. 765,593, now Patent No. 3,033,032, and entitled, "Force Measuring Device," filed November 28, 1958 and assigned Serial No. 776,833 now Pat. No. 3,084,297.

The present invention was primarily designed to meet requirements of missile applications wherein apparatus must be embodied which will sense various forces imposed upon the missile in accordance with the direction in which it is traveling, for example, relating to acceleration or deceleration forces and/or G forces. It will be appreciated, however, that in view of the structure and function of the force sensing apparatus of the present invention that it may be embodied in a multitude of applications.

With the above in mind, it is an object of the present invention to provide a force measuring or force sensing device which may be simply constructed with a minimum number of parts.

Another object of the present invention is to provide a force sensing or force measuring apparatus, which embodies simplified transducer means for remotely yielding an indication of the forces imposed.

Another object of the present invention is to provide a force sensing or force measuring apparatus which is rugged in construction and will accommodate for measurement an unusually wide range of imposed loads.

Another object of the present invention is to provide a force sensing or force measuring apparatus which will yield readings of either a compressive or tensile load.

Another object of the present invention is to provide a force sensing or force measuring device which is durable and accurate in its operation.

Another object of the present invention is to provide a force sensing or force measuring device which embodies simple tare adjustment means.

Another object of the present invention is to provide a force sensing or force measuring device, which embodies structure preventing inadvertent overloading.

Still another object of the present invention is to provide a force sensing or force measuring device of relatively small overall dimensions and which may be constructed to have a low overall weight relative to dynamometer and force measuring apparatus presently available on the market.

These and other objects and advantages of the present invention are generally achieved by providing a force sensing or measuring device comprising in combination a casing, and a first force transmitting member coupled thereto. A second force transmitting member is also provided, and the force transmitting members are designed for coupling to either compressional or tensional force exerting means.

A flexible member is embodied in the casing and includes one terminal portion thereof rigidly coupled to the casing and another terminal portion rigidly coupled to the second force transmitting member. The terminal portions of the flexible member define therebetween an intermediate portion which is designed to flex in response to application of the force exerting means. In response to such flexing, the second force transmitting member will move relative to the casing. Transducer means are co-operatively coupled to the casing and to the second force transmitting member, respectively, to indicate the relative movement.

In a preferred embodiment of the force measuring or force sensing device of the present invention, means are additionally coupled to the casing to effect initial relative movement of the transducer means to compensate for tare loads. Furthermore, means are provided in coupled relationship to the casing to limit movement of the flexible member and thus prevent the possibility of overload and possible damage to the force sensing apparatus.

A better understanding of the present invention will be had by reference to the drawings showing merely an illustrative embodiment and in which:

FIGURE 1 is a cross sectional view of the force sensing apparatus according to the present invention;

FIGURE 2 is an enlarged perspective view of the tare adjustment means employed in conjunction with the force sensing apparatus of FIGURE 1, and, FIGURE 3 is a modification of one of the flexible members of FIGURE 1.

Referring now to the drawings, there is shown in FIGURE 1 a force sensing device in accordance with the present invention including force transmitting members in the form of draw bars 10 and 11. The draw bars 10 and 11 may be threaded at 12 and 13. In the event that indirect loads or forces are imposed upon the force sensing apparatus, the draw bars 10 and 11 will remain uncoupled. However, the threading 12 and 13 is merely indicative of one means of coupling the draw bars 10 and 11 to opposing tensional or compressive force exerting members.

As an important part of the present invention, a flexible member 14 of relatively thin cross section is integrally formed with the draw bar 10 and is rigidly coupled to the casing 15 housing the apparatus.

Co-operating with the flexible member 14, is a safety ring 16 which is threadedly connected at 17 to an end portion 18 of the casing 15. The flexible member 14 is of annular shape and has its outer peripheral portion rigidly held between the safety ring 16 and the sidewalls of the casing 15.

For convenience in threading the safety ring 16 onto the end portion 18, tool slots 19 may be provided in the outer face thereof. The safety ring 16 embodies an inner annular stepped portion 20 spaced a slight distance from an opposing shoulder 21 provided on the draw bar 10. The safety ring 16 further includes an inner face 22 spaced a slight distance from the intermediate body or uncoupled portion of the flexible member 14.

The draw bar 10 is provided with a threaded bore 23 to receive a threaded end portion 24 of a support member 25.

At the other end of the casing 15, there is provided another safety ring 26 which is similarly threadedly connected at 27 to the opposite end portion 28 of the casing 15. As with the construction of safety ring 16, the safety ring 26 may also be provided with tool slots 29. The safety ring 26 has an inner face 30 which is spaced from another flexible member 31. The flexible member 31 may have a disc-like shape as shown with its terminal or peripheral edge portion rigidly coupled in the casing 15 against the safety ring 26. The flexible member 31 also includes a threaded collar 32 screwed onto the other end portion 33 of the supporting member 25 heretofore referred to.

An annular transformer casing 34 of U-shaped cross section is rigidly coupled to the support means 25 near the end portion 24 and has mounted therein suitable coil means 35. Similarly, another transformer casing 36 of identical construction is rigidly coupled to the support means 25 near the end portion 33 thereof and embodies coil means 37. Appropriate leads schematically indicated at 38 and 39 lead respectively from the coil means 35 and coil means 37 of the opposing transformers. For this purpose an aperture or opening 40 is provided in the casing sidewalls 15. The leads 38 and 39 may be connected to current measuring and indicating apparatus, for example, as disclosed in applicant's co-pending application, Serial No. 776,833.

Secured to the inner surface of the casing 15 is a sleeve member 41 having external threads and which also includes threading 43 on its inner sidewalls. Threadedly coupled to the inner sidewalls 43 of the sleeve member 42 are annular transformer discs 44 and 45.

With this type of construction, the sleeve 41 may be axially screwed in either direction to, respectively, bring the discs 44 and 45 closer to the transformer casing 34 or closer to the transformer casing 36. It is also evident because of the threaded connection between the discs 44 and 45 and the sleeve 41 that either or both of the discs 44 and 45 may be moved axially in either direction relative to the sleeve 41 as such. The discs 44 and 45 function to magnetically vary the air gap of the respective transformers 34 and 36 in accordance with conventional transformer construction.

After the force sensing apparatus has been assembled, the unitary movement of the discs 44 and 45 may be accomplished through tare adjustment means provided on the exterior of the casing 15. Thus, the sleeve 41 as more clearly shown in the view of FIGURE 2 embodies a slot 46 adapted to receive a tongue 47 extending radially inwardly from an arcuate member 48 shaped to the contour of the outer peripheral surface of the casing 15. The arcuate member 48 has defined therein an elongated slot 49. Screws 50 and 51 extend through the slot 49 and are threaded into the casing 15. By loosening the screws 50 and 51, the arcuate member 48 may be rotated a slight distance to in turn effect rotation of the sleeve 41 and the co-operating tongue 47 and slot 46. As a consequence, the discs 44 and 45 may either be brought closer to the transformer casing 34 or towards the transformer casing 36.

The operation of the improved force sensing apparatus of the present invention may now be described. In conventional applications, as heretofore mentioned, the draw bars 10 and 11 would be coupled either by the threaded means 12 and 13 shown or by other coupling structures to compressive force or tensile force exerting members. However, in certain applications, for example, the missile application as heretofore mentioned, the apparatus as a whole would be subjected to the forces imposed thereon.

Assuming that a compressional load were imposed on the draw bars 10 and 11 urging these members inwardly, it is evident that both the flexible member 14 and the flexible member 31 would flex towards the right (as shown in FIGURE 1), which would cause movement of support member 25 and in turn effect movement of the transformer casing 34 towards the disc 44 and movement of the transformer casing 36 away from the disc 45. In consequence, the differential output of the opposing transformers would be increased and an electrical reading attained proportional to the forces imposed.

It is to be noted that the discs 44 and 45 are coupled to the casing 15 but have inner diameters greater than the support means 25 such that movement of the support means will not affect the disc members 44 and 45. It will also be noted that the flexible member 31 can only move a limited distance "Y" before having its inner surface impact the inner face 30 of the safety ring 26. Thereafter, the support means 25 and member 31 will be bearing directly against the safety ring 26 and no further movement of the support means 25 and coupled flexible members 14 and 31 can be effected to any appreciable extent.

A similar action takes place when a tensional load is imposed on the draw bars 10. In such event the support means 25 will be urged in a direction towards the left in FIGURE 1 whereby the flexible member 14 will move towards the inner surface 22 of the safety ring 16. In consequence, the spacing "X" between the inner surface 22 of the safety ring 16 and flexible member 14 will be decreased until such time as the shoulder 21 of the draw bar 10 abuts against the step portion 21 of the safety ring 16. Again, when this point is reached, no further flexing in the member 14 will be possible as the force will be transmitted directly from the support means 25 to the safety ring 16. Of course, as this movement occurs, the transformer casing 36 will move closer to the disc 45 while the transformer casing 34 will move away from the disc 44. Thus, an opposite differential reading will be obtained.

In the event a zero adjustment is required after the initial force or tare load is applied, the arcuate member 48 may be turned upon loosening of the screws 50 and 51 to in turn effect movement of the threaded sleeve 41 and coupled disc 44 and 45 to compensate for the tare load imposed.

In certain instances, it may be desirable to provide the flexible members with annular beads or the like, for example, as illustrated in FIGURE 3 by flexible member 52 embodying bead 53. With such a construction, the possibility of the radially outer peripheral portion of the flexible member being drawn out of its position in the casing is eliminated.

It will thus be appreciated that the force sensing apparatus of the present invention provides a novel, simple and rugged construction with limited overall dimensions and weight and yet embodying a minimum number of parts. It will be evident to those skilled in the art, however, that various minor changes and modifications may be made without departing from the spirit and scope of the invention as set forth in the following claims.

What is claimed is:

1. A force measuring device comprising in combination: a hollow cylindrical casing; a first end closure connected to said casing; a second opposing end closure connected to said casing; a first shaft extending freely through said first end closure axially into said casing; a first flexible annular member connected on its inner periphery to said first shaft and on its outer periphery to said casing; a second flexible annular member spaced on said first shaft from said first annular member and connected on its inner periphery to said first shaft and on its outer periphery to said casing, said annular members being disposed within said casing; a second shaft axially depending from the exterior of said second end closure, the outer ends of said first shaft and said second shaft, respectively, embodying means for coupling to force exerting means; transducer means within said casing, said transducer means comprising one portion connected to said first shaft in spaced relationship to said casing and another portion secured to said casing in spaced relationship from said first shaft, said one portion of said transducer means comprising a pair of opposing axially spaced transformers mounted on said first shaft between said flexible members, and said another portion of said transducer means comprising a pair of annular discs rigidly coupled to the interior of said casing encircling said first shaft and interposed between said opposing transformers to magnetically co-function therewith.

2. A force measuring device, according to claim 1, in which each of said transformers comprises an annular transformer casing of U-shaped cross section embodying a coil mounted therein.

References Cited in the file of this patent

UNITED STATES PATENTS

| | | |
|---|---|---|
| 2,240,184 | Hathaway | Apr. 29, 1941 |
| 2,510,073 | Clark | June 6, 1950 |
| 2,624,027 | Clark | Dec. 30, 1952 |
| 2,641,742 | Wolfe | June 9, 1953 |
| 2,679,628 | Matthews | May 25, 1954 |
| 2,740,941 | Kelly | Apr. 3, 1956 |
| 2,767,973 | Ter Veen | Oct. 23, 1956 |
| 2,870,422 | Gindes | Jan. 20, 1959 |

FOREIGN PATENTS

| | | |
|---|---|---|
| 969,884 | France | May 31, 1950 |